(12) United States Patent
Frank et al.

(10) Patent No.: US 7,413,124 B2
(45) Date of Patent: Aug. 19, 2008

(54) RFID READER SUPPORTING ONE-TOUCH SEARCH FUNCTIONALITY

(75) Inventors: John W. Frank, Cottage Grove, MN (US); Scott D. Pearson, Woodbury, MN (US); Christopher R. Yungers, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 391 days.

(21) Appl. No.: 11/184,631

(22) Filed: Jul. 19, 2005

(65) Prior Publication Data

US 2007/0017983 A1    Jan. 25, 2007

(51) Int. Cl.
*G08B 13/14* (2006.01)
*H04Q 5/22* (2006.01)

(52) U.S. Cl. .................. 235/451; 340/10.1; 340/572.1

(58) Field of Classification Search .............. 235/492, 235/451; 340/10.1, 10.4, 572.1, 572.4, 572.7, 340/10.2
See application file for complete search history.

(56) References Cited

U.S. PATENT DOCUMENTS

| | | | |
|---|---|---|---|
| 4,688,026 | A | 8/1987 | Scribner et al. |
| 4,814,742 | A | 3/1989 | Morita et al. |
| 4,827,395 | A | 5/1989 | Anders et al. |
| 5,689,238 | A | 11/1997 | Cannon, Jr. et al. |
| 5,729,697 | A | 3/1998 | Schkolnick et al. |
| 5,771,003 | A | 6/1998 | Seymour |
| 5,785,181 | A | 7/1998 | Quartararo, Jr. |
| 5,929,779 | A | 7/1999 | MacLellan et al. |
| 5,963,134 | A | 10/1999 | Bowers et al. |
| 6,195,006 | B1 | 2/2001 | Bowers et al. |
| 6,232,870 | B1 | 5/2001 | Garber et al. |
| 6,232,876 | B1 | 5/2001 | Maloney |
| 6,286,762 | B1 | 9/2001 | Bodnar et al. |
| 6,286,763 | B1 | 9/2001 | Reynolds et al. |

(Continued)

FOREIGN PATENT DOCUMENTS

DE    19856762    5/2000

(Continued)

OTHER PUBLICATIONS

Berquist, U.S. Appl. No. 09/755,714, "User Interface for Portable RFID Reader," filed Jan. 1, 2001.

(Continued)

*Primary Examiner*—Daniel A Hess
(74) *Attorney, Agent, or Firm*—John A. Burtis

(57) ABSTRACT

Techniques are described for performing a one-touch search to locate a selected item associated with an RFID tag. The techniques allow, for example, an RFID reader to perform a search where a user selects an item from a list, and the RFID reader, without any further input from the user, interrogates one or more RFID tags until an RFID tag associated with the selected item is found. The RFID reader may also allow a user to associate items with an RFID tag, view items associated with an RFID tag, and edit item lists associated with an RFID tag. In this way, an RFID reader may associate any number of items to an RFID tag, repeatedly edit existing item lists associated with an RFID tag, and quickly search multiple RFID tags until a desired item associated with a particular RFID tag is found.

32 Claims, 8 Drawing Sheets

U.S. PATENT DOCUMENTS

| | | |
|---|---|---|
| 6,354,493 B1 * | 3/2002 | Mon .................... 235/380 |
| 6,424,262 B2 | 7/2002 | Garber et al. |
| 6,448,886 B2 | 9/2002 | Garber et al. |
| 6,486,780 B1 | 11/2002 | Garber et al. |
| 6,600,418 B2 | 7/2003 | Francis et al. |
| 6,608,551 B1 | 8/2003 | Anderson et al. |
| 6,693,539 B2 | 2/2004 | Bowers et al. |
| 6,768,419 B2 | 7/2004 | Garber et al. |
| 6,816,075 B2 | 11/2004 | Grunes et al. |
| 6,883,710 B2 | 4/2005 | Chung |
| 2002/0008140 A1 | 1/2002 | Bodnar et al. |
| 2002/0008621 A1 | 1/2002 | Barritz et al. |
| 2002/0196126 A1 | 4/2003 | Eisenberg et al. |
| 2004/0069851 A1 | 4/2004 | Grunes et al. |
| 2004/0172270 A1 | 9/2004 | Sugimoto et al. |
| 2004/0186768 A1 | 9/2004 | Wakim et al. |
| 2006/0176177 A1 * | 8/2006 | Heinze et al. ............ 340/572.1 |
| 2006/0267730 A1 * | 11/2006 | Steinke et al. .............. 340/10.1 |

FOREIGN PATENT DOCUMENTS

| | | |
|---|---|---|
| WO | WO 99/64974 | 12/1999 |

OTHER PUBLICATIONS

Berquist, et al., U.S. Appl. No. 09/882,969, "Methods of Managing the Transfer, Use, and Importation of Data," filed Jun. 15, 2001.

Berquist, U.S. Appl. No. 09/876,432, "RFID Data Collection and Use," filed Jun. 7, 2001.

PCT Search Report, PCT/US2006/27662.

* cited by examiner

RFID READER SUPPORTING ONE-TOUCH SEARCH FUNCTIONALITY

TECHNICAL FIELD

The invention relates to electronic label identification and, more particularly, to radio frequency identification (RFID) readers.

BACKGROUND

Radio frequency identification (RFID) tags are small electronic devices capable of storing data. RFID tags may be active, in which case the tag includes a battery or other power source, or passive, in which case the tag does not include any internal power source. An active RFID tag broadcasts its stored information using its internal power, and an RFID reader may detect the information broadcasted by the active RFID tag. To read a passive RFID tag, however, a reader must first supply the RFID tag with power.

More specifically, to read a passive RFID tag, an RFID reader interrogates the RFID tag to provide power to the tag. Once powered, the RFID tag may transmit the stored data to the RFID reader. By way of example, the RFID tag may store a Universal Identification (UID) that uniquely identifies the RFID tag. Various collections of UIDs have been developed and standardized, and are particularly useful for consumer product tracking in the supply chain and retail environments. For example, RFID tags are often viewed as a replacement or supplement to conventional techniques for identifying products, such as Universal Product Code (UPC) bar codes.

The RFID reader may interrogate the RFID tag to obtain the UID and can associate the UID with a particular item to which the RFID tag is attached. Generally, the RFID tag is affixed to the product, like an ordinary label, in order to identify the product. However, manufacturers may also integrate the RFID tag directly into the product packaging material. In addition, RFID tags have been used to collectively identify a set of identical items, such as a pallet of identical products.

The RFID reader typically comprises an RF module attached to an antenna for powering the RFID tag. The RF module induces a current in the antenna to produce an electromagnetic field, which can interrogate the RFID tag. The RFID tag includes an antenna to capture the electromagnetic field from the RFID reader, an energy storage device (such as a capacitor) to store energy from the captured field, and an integrated controller that contains logic to broadcast the UID. Once the electromagnetic field is brought within range of the RFID tag antenna, the electromagnetic field induces a current in the antenna of the RFID tag, thereby charging the energy storage device of the RFID tag. The charged energy storage device acts as a short-term passive power source to provide power to the integrated controller of the RFID tag. Once powered, the integrated controller broadcasts the UID to the RFID reader via the antenna of the RFID tag, typically by modulating circuit parameters. The RFID reader receives a modulated electromagnetic field from the RFID tag and decodes the received signal to determine the UID. In addition, the RFID reader may compare the UID to a database in order to determine the product associated with the UID.

SUMMARY

In general, the invention is directed to techniques that can be implemented in an RFID reader to allow for efficient searching of RFID tags to find a selected item. More specifically, the techniques allow an RFID reader to perform a one-touch search, which enables the RFID reader to interrogate a plurality of RFID tags to find a selected item associated with one of the RFID tags upon receiving a selection from the user. The RFID reader may terminate the interrogation upon identifying the RFID tag associated with the selected item. Furthermore, the techniques allow the RFID reader to associate items with a particular RFID tag, edit the item association, and view the item associations. The user may utilize the RFID reader to quickly and efficiently locate the selected item by way of the one-touch search. In addition, the user may quickly view and edit items associated with an RFID tag without the limitations commonly associated with traditional labels.

For example, a user may interact with an RFID reader via an input interface to perform a one-touch search. In order to allow for such item searching, the controller presents a list of items, and the user may scroll through the items and select an item from the list, e.g., scroll to the item of interest and press enter to make the selection. After receiving the selection, the controller determines the RFID tag associated with the item, enables an RFID interface so that RFID reader may interrogate RFID tags, and determines whether the RFID tag associated with the item was found. If the controller determines that the RFID tag is associated with the selected item, the controller may issue an alert, such as an audio or visual alert. For example, the controller may cause the display of text or images to indicate to a user that a tag match has occurred, or drive an audio device to issue an audio alert, such as a tone. However, if the controller does not identify the RFID tag associated with the item, the controller may issue a different alert, and may cause the display of text or images to indicate the RFID tag is not a match. Importantly, after an unsuccessful match, the controller continues to enable the RFID interface to interrogate RFID tags. In accordance with one-touch searching, RFID reader interrogation of RFID tags may continue indefinitely until a match is found, the user causes the controller to enter another state, or a timer expires.

The RFID reader may provide other functionality, such as the ability to view item lists associated with an RFID tag, the ability to associate items with an RFID tag, the ability to edit item lists associated with an RFID tag, and the ability to operate in a power down, or sleep mode. In any case, the techniques described herein may provide many benefits over traditional labels or conventional RFID reader technology because with the techniques described herein, a user may quickly associate any number of items to an RFID tag, quickly edit items associated with an RFID tag, and quickly and efficiently scan RFID tags to find a desired item via the one-touch search. Moreover, the described RFID reader may provide a low cost alternative to stand-alone RFID readers and other devices that may incorporate RFID technology.

The invention may be particularly useful for applications in which a number of items are associated with one RFID tag for organizational purposes. A user my associate items with the RFID tag using a database generation state of the device. Later, if the user wants to find a particular item, the one-touch searching techniques can be very helpful. For example, the user may separate several items into different containers, e.g., in packing or moving to a new home. Each of the containers can be assigned an RFID tag, and the user may store several related or unrelated items in a given container. After associating such items with the RFID tag, the user can later use the one-touch searching functionality of the RFID reader, as described herein, to quickly locate an item of interest. Many other applications of the device also exist, such as management of personal collections of items, management of photo albums, or personal inventory applications.

In one embodiment, a method comprises receiving input from a user selecting an item from an item list in a radio frequency identification (RFID) reader, identifying an RFID tag associated with the selected item, and causing the RFID reader to search for the RFID tag associated with the selected item.

In another embodiment, the invention provides a radio frequency identification (RFID) reader comprising an input interface that receives input from a user selecting an item from an item list stored in the device, and a controller that identifies an RFID tag associated with the selected item, and causes the RFID reader to search for the RFID tag associated with the selected item.

In another embodiment, a method comprises receiving input from a user selecting a state of a radio frequency identification (RFID) reader from a plurality of states, wherein the plurality of states include an item search state, a generate database state, and a tag read state; and controlling the RFID reader according to the selected state.

In another embodiment, the invention provides a radio frequency identification (RFID) reader comprising an input interface that receives input from a user selecting a state of the reader from a plurality of states, wherein the plurality of states include an item search state, a generate database state and a tag read state; and a controller that operates the reader according to the selected state.

The techniques described herein may be implemented in an RFID reader in hardware, software, firmware, or any combination thereof. If implemented in software, the invention may be embodied in a computer readable medium comprising instructions that upon execution in an RFID reader cause the reader to perform on or more of the techniques described herein.

The details of these and other embodiments of the invention are set forth in the accompanying drawings and the description below. Other features, objects, and advantages of the invention will be apparent from the description and drawings, and from the claims.

DETAILED DESCRIPTION

Figure 1:
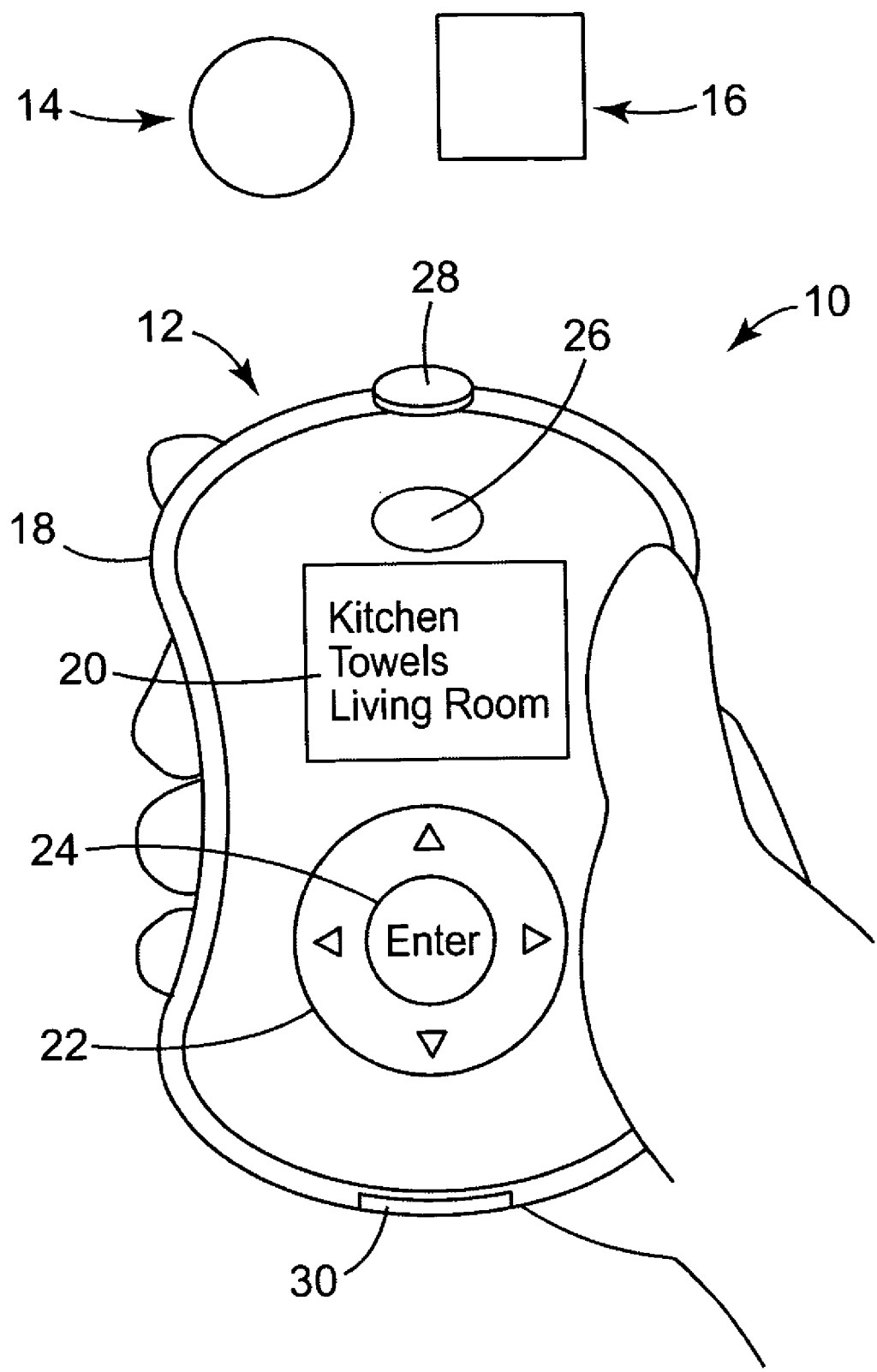
FIG. 1 is a block diagram illustrating a Radio Frequency Identification (RFID) system that associates RFID tags with item lists.

FIG. 1 is a block diagram illustrating a Radio Frequency Identification (RFID) system 10. RFID system 10 comprises an electronic RFID reader 12 and one or more RFID tags 14, 16. As described herein, RFID reader 12 associates RFID tags 14, 16 with item lists. RFID reader 12 also supports one-touch searching functionality. For such one-touch searching, RFID reader 12 may interrogate a plurality of RFID tags to find a selected item associated with one of the RFID tags in response to a selection from the user.

In the illustrated example, system 10 includes an active RFID tag 14 and a passive RFID tag 16. Active RFID tag 14 comprises a power source to allow for broadcast of the information on tag 14 and the power source may also increase the range of active RFID tag 14. Passive RFID tag 16 does not include a power source, but requires power from RFID reader 12. The techniques described herein may be used with passive RFID tags, active RFID tags or both. However, most of the details of the invention are described in the context of passive RFID tags. If active tags are used, the tag itself may issue an audible alert upon being interrogated, e.g., to help the user locate the tag. The active or passive RFID tags may also be one-way or two-way devices, meaning that the reader may communicate one-way information to the tag, or the reader may both write data to the tags and read data from the tags.

RFID reader 12 may comprise a stand-alone low cost RFID reader or any other device that incorporates RFID technology to perform the techniques described herein. In the example of FIG. 1, RFID reader 12 comprises a housing 18 that houses a display 20, an input interface 22, an "enter" button 24, a sound interface 26, an RFID interface 28, and a receptacle 30. RFID reader 12 displays information via display 20, and a user may interact with RFID reader 12 via input interface 22 and enter button 24 to cause RFID reader 12 to traverse between various states. The states of RFID reader 12 may include an item search state, a tag read state, a generate database state, and a sleep state. Other states, or sub-states may also be defined, such as a tag write state or sub-state. In any case, RFID reader 12 may scan one of RFID tags 14, 16 via RFID interface 28 to associate an item presented by RFID reader 12 via display 20 to one of RFID tags 14, 16, may determine an item list associated with one of RFID tags 14, 16, or may edit an item list associated with one of RFID tags 14, 16. Further, RFID reader 12 may receive input from the user via input interface 26 selecting an item from an item list presented by RFID reader 12 via display 20, identify an RFID tag associated with the selected item, and cause RFID interface 28 to search for the RFID tag associated with the selected item.

Generally, a user utilizes RFID system 10 to associate one of active RFID tag 14 or passive RFID tag 16 with various items. The items themselves may or may not include their own tags. For example, in some cases, the user does not affix an RFID tag to each item, but rather, affixes the RFID tag to a storage unit, such as a box, container, photo album, or the like, that stores an aggregate of items. For example, a user may affix passive RFID tag 16 to a box containing various items. Then, via interactions with input interface 22 and enter button 24, the user may navigate to the generate database state and associate the items with passive RFID tag 16, thereby creating a database to store this item list. Next, the user may continue to utilize RFID system 10 to associate other boxes affixed with RFID tags to the items stored in the boxes. RFID reader 12 adds these other item lists to the database such that each RFID tag has an associated item list. If the user forgets which items are stored in a particular box, the user, via interactions with input interface 22 and enter button 24, may enter the tag read state and scan an RFID tag affixed to a box, such as passive RFID tag 16. In this case, RFID reader 12 may retrieve the item list associated with passive RFID tag 16 from the database and display the item list on display 20.

Alternatively, if the user desires to find a particular item located in one of the various containers, boxes, photo albums or storage units, the user may, via interactions with input interface 22 and enter button 24, enter the item search state and perform a one-touch search. A one-touch search allows the user to select a specific item from a list or, alternatively, manually enter an item that the user wishes to locate. After entering, selecting or highlighting the item and pressing enter button 24 once, the user may scan a plurality of RFID tags affixed to the boxes until the item list associated with the most recently scanned RFID tag contains the selected item. In this manner, the initiation of the tag search can be simplified insofar as the user simply enters or locates and highlights the item of interest from a list and presses enter button 24 once to initiate the search. RFID reader 12 may then notify the user if a most recently scanned RFID tag is associated with the selected item, e.g., by issuing an audio alert via sound interface 26 and/or a visual indication (such as text or images) to the user via display 20. Importantly, the search may continue without further interaction by the user if a different tag is read, the different tag being non-associated with the selected item.

Throughout all of these states, RFID reader 12 may display prompts and other pertinent information via display 20 and issue alerts, such as audio alerts via sound interface 26, to indicate one or more of a correct RFID scan, incorrect RFID scan, tag match, and tag not match. Furthermore, in some embodiments, RFID reader 12 may receive audio input via sound interface 26 and may interact with other devices via receptacle 30. In general, RFID reader 12 allows the user to quickly and efficiently associate items with an RFID tag, determine the individual items associated with an RFID tag, and perform a search for a particular item associated with a given RFID tag. Generally, RFID system 10 provides a comprehensive solution to organizing various items and does not suffer the drawbacks of conventional labels, such as a small label space to record items, the inability to easily edit the labels to reflect the changes of the contents, and the like.

Figure 2:
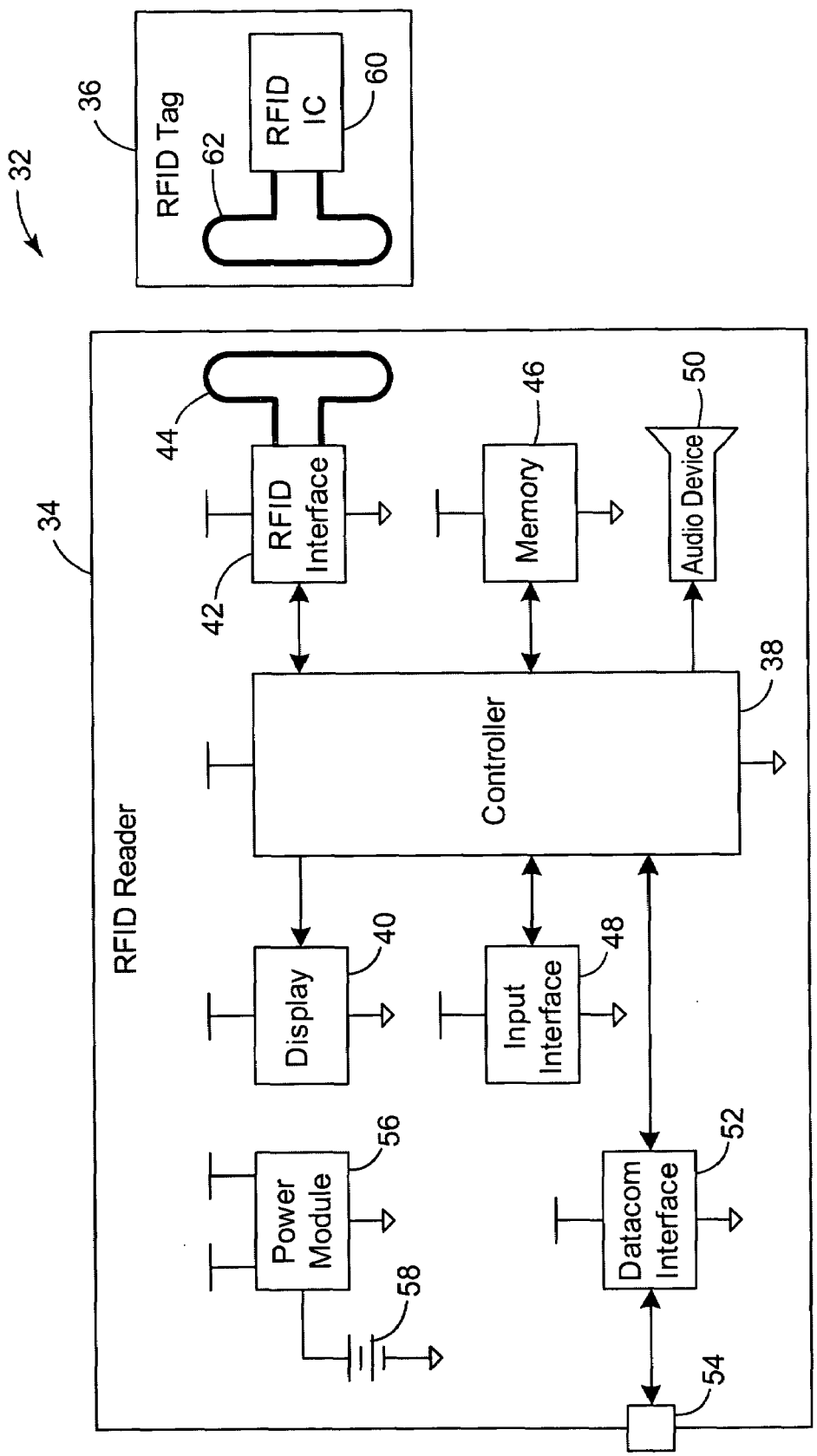
FIG. 2 is a block diagram illustrating an exemplary RFID system comprising an RFID reader and a passive RFID tag.

FIG. 2 is a block diagram illustrating an exemplary RFID system 32 comprising an RFID reader 34 and a passive RFID tag 36. RFID reader 34 and passive RFID tag 36 may be substantially similar to RFID reader 12 and passive RFID tag 16 of FIG. 1, respectively. RFID reader 34 provides one-touch search capabilities that a user may utilize to quickly and efficiently locate a particular item associated with an RFID tag, as well as, provide the other capabilities associated with the tag read, generate database, and sleep states, discussed in more detail below. Again, while RFID system 32 comprises passive RFID tag 36, RFID system 32 is not limited to passive RFID technology and may include other RFID tags, such as active RFID tag 14 (FIG. 1).

RFID reader 34 comprises a controller 38, a display 40 (such as an liquid crystal display or any other suitable display technology), and an RFID interface 42. Both display 40 and RFID interface 42 are coupled to controller 38. Controller 38 may cause display 40 to display item lists and text indicating the status of RFID reader 34. Controller 38 may cause RFID interface 42 to interrogate one or more RFID tags, such as passive RFID tag 36, via antenna 44.

RFID reader 34 also comprises a memory 46, an input interface 48, an audio device 50 (such as a speaker), and a data communication interface 52 ("Datacom Interface 52"), wherein controller 38 is coupled to each of memory 46, input interface 48, audio device 50, and datacom interface 52. Memory 46 may include a database that stores the association of various items with RFID tags, and controller 38 may access memory 46 to update, edit, or search the database. Controller 38 may also cause audio device 50 to generate audio alerts to indicate the status of RFID interface 34. Controller 38 may also communicate with another device attached to RFID reader 32 via a receptacle 54 through datacom interface 52, which manages the communications between controller 38 and the other device. For example, the other device may be a personal computer, laptop computer, or the like, which can be used to simplify data entry, e.g., during database generation.

Controller 38 may comprise a programmable processor (e.g., a digital signal processor (DSP) or microcontroller) that may execute instructions stored in the processor or in memory 46, to perform the various operations, such as the one-touch search. Input interface 48 may comprise a joystick, directional pad (as shown in FIG. 1), a numerical keypad, a small keyboard, a touch-sensitive scroll wheel, an "enter" button, or other data input interfaces. Memory 46 may comprise non-volatile memory, such as Flash, Compact Flash, Electrically Erasable Programmable Read-Only Memory (EEPROM), Ferroelectric Random Access Memory (FRAM), Non-Volatile Random Access Memory (NVRAM), or any volatile or non-volatile data storage units.

Receptacle 54 may comprise one of a Firewire port, Universal Serial Bus (USB) port, serial port, Ethernet port, or any other type of port capable of transmitting data to another device. Receptacle 54 may also be replaced or complimented with a wireless data link. Display 40 may comprise a wide variety of display types, such as touch-sensitive liquid crystal display, or any other type of display capable of presenting information. Also, other types of sound interfaces could be included, such as a microphone to allow for voice activated or voice responsive control of RFID reader 34.

RFID reader 34 also includes a power module 56 that manages and provides power from power source 58 to the components of RFID reader 34, such as controller 38, display 40, RFID interface 42, and the like. Power source 58 may comprise one or more of standard batteries, rechargeable batteries, and other types of power sources for mobile devices.

Passive RFID tag 36 comprises an RFID integrated circuit 60 ("RFID IC 60") coupled to an antenna 62. Not shown in FIG. 2 is an energy storage device, which may or may not be integrated into the RFID IC. RFID IC 60 manages the current induced within antenna 62 and may charge a capacitor within RFID IC 60 to provide a short-term passive power source that RFID IC 60 may use to power communications with RFID reader 34. In some embodiments, passive RFID tag 36 may comprise a small memory module, and RFID reader 34 may write data to passive RFID tag 36, which may store the data to the small memory module. In other embodiments, passive RFID tag 36 may include a small, integrated light source, such as a light emitting diode (LED) that may, for example, blink during active communication with RFID reader 34. If active tags are used, the active tags may provide an audible alert upon being interrogated in order to help a user locate the tag.

In general, a user may interact with RFID reader 34 to traverse between the tag read, item search, generate database, and sleep states, which are discussed in more detail below. Initially, controller 38 may start in the tag read state and displays information relevant to this state via display 40. The user can perform a tag read or cause controller 38 to enter one of the other states by interacting with controller 38 via input interface 48. For example, the user may cause controller 38 to enter the item search state to perform a one-touch search via interactions with input interface 48. Once in the item search state, controller 38 may cause display 40 to display an item list, and the user may choose an item from the list. The user presses the enter button 24 to initiate a one-touch search with respect to the chosen item. At this point controller 38 may identify an RFID tag associated with the selected item, and cause RFID interface 42 to search for the RFID tag associated with the selected item. Controller 38 may cause RFID interface 42 to search after input interface 48 receives input from a user indicating a selection of an item. In particular, controller 38 causes RFID interface 42 to continue searching for the RFID tag associated with the selected item until the RFID tag is found, the user interacts with the input interface, or a timer expires. Thus, the one-touch search requires the user to simply indicate a selection, e.g., identify and select the item, and, with no further input from the user, RFID reader 34 may continue to scan RFID tags, until the selected item is found, the user intervenes, or a timer expires.

During execution of one of the various states, controller 38 may access memory 46 to create a new database, retrieve information from a previously created database, delete information from a database, or edit information stored in a previously created database. Controller 38 may also access other information stored in memory 46, such as item lists, user preferences, and the like, and may also edit this other information based on user interaction with controller 38. Controller 38 may also send audio information to audio device 50 to indicate the various alerts, described above. Finally, controller 38 may interact with another device, such as a personal computer, another RFID reader, or the like, that is connected to RFID reader 34 via receptacle 54. Datacom interface 52 manages the communication between the other device and may provide buffers to enable quick transfers of information between the other device and RFID reader 34.

In response to user input via input interface 48, controller 38 may cause RFID interface 42 to interrogate passive RFID tag 36 by creating a current through antenna 44. The current induces an electromagnetic field that radiates from antenna 44. Once the user brings antenna 44 within proximity of antenna 62 of passive RFID tag 36, the electromagnetic field may induce a current through antenna 62. RFID IC 60 receives the current from antenna 62 and uses this current to power the broadcast of the identifier, or UID, associated with RFID tag 36. When communication between RFID tag 36 and RFID reader 34 is taking place, the devices may be said to be electromagnetically coupled. In any case, upon receiving the broadcasted UID via antenna 44 and RFID interface 42, controller 38 may perform various operations, which are discussed in more detail below, to determine, for example, whether passive RFID tag 36 is associated with any items. Controller 38 may also perform operations on the UID to determine if passive RFID tag 36 is associated with the selected item of a one-touch search.

RFID reader 34 may incorporate several other modules, such as a voice recognition module, a microphone, an infrared port, a Bluetooth module, and the like, that controller 38 may control. In addition memory 46 may store and controller 38 may execute further software modules, such as a calendar, contact lists, games, voice recognition software, and intelligent input software. However, these additional software modules may increase the cost of RFID reader 34 and may be undesirable for this reason.

Without the above additional modules, RFID reader 34 may offer a low cost alternative to more complex RFID readers. In any case, RFID reader 34 allows users to associate nearly an unlimited number of items with an RFID tag, since the association is maintained in a database within RFID reader 34 and not on the more limited memory space associated with a given RFID tag. In addition, the amount and complexity of the associations are limited by the relational database and the memory size, and can be made complex while still providing simple searching capabilities to the user. Moreover, RFID reader 34 provides users with the convenience of quickly editing existing lists. Traditional labels, in contrast, do not easily allow a user to make changes to the label due to the lack of label space. Finally, RFID reader 34 provides for one-touch searches, which allows a user to quickly scan the contents of a series of storage units to find a desired item.

Figure 3:
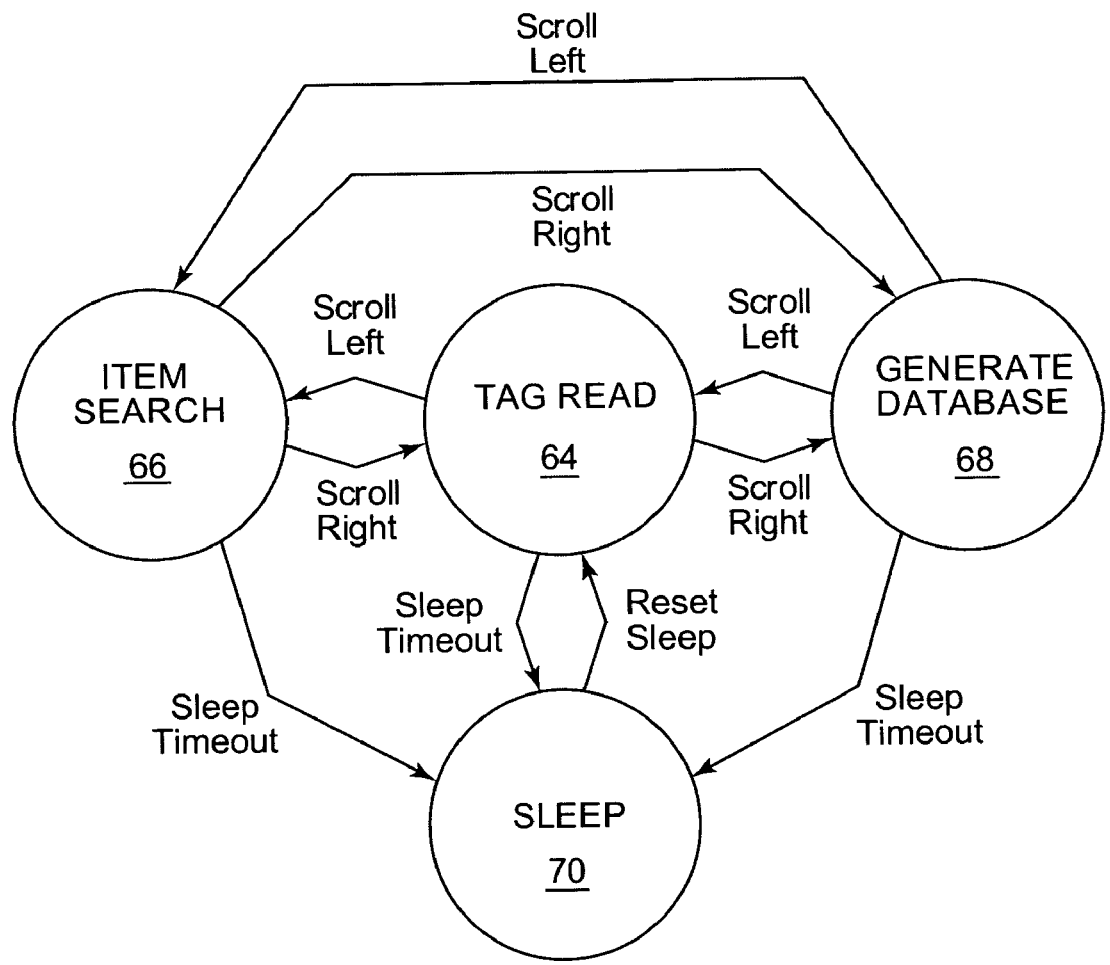
FIG. 3 is a state diagram illustrating exemplary operation of a controller of the RFID reader depicted in FIG. 2.

FIG. 3 is a state diagram illustrating exemplary operation of controller 38 of RFID reader 34 (FIG. 2). Upon powering up RFID reader 34, controller 38 begins in tag read state 64. However, any of the states could be set as the default, or the default state could be the most recent state that was used. The user may navigate between states by navigating a joystick or other actuation device. In one example, the user may navigate between states by navigating a joystick left and right, and may navigate within a state by navigating the joystick up and down. Selection of a state or item illustrated in a state may be performed by pressing the joystick. Sub-states could also be defined for one or more of the states, if desired.

Once in tag read state 64, controller 38 may cause RFID interface 42 to interrogate an RFID tag, such as passive RFID tag 36. Next, controller 38 may determine whether an item list exists for passive RFID tag 36 and if so, cause display 40 to display the item list to the user. From the tag read state, a user may select the left directional arrow ("scroll left") of input interface 48 to cause controller 34 to enter into item search state 66. The user may also select the right directional arrow of input interface 48 ("scroll right") to cause controller 34 to enter into generate database state 68. If the user makes no selection for a programmed amount of time, controller 34 times out and enters into sleep state 70 after a set period of time ("sleep timeout").

Assuming, for purposes of illustration, that the user selects the left directional arrow of input interface 48, controller 34 enters into item search state 66. Once controller 38 enters into item search state 66, input interface 48 may receive input from a user selecting an item from an item list stored in memory 46. Next, controller 38 may identify an RFID tag associated with the selected item and search for the RFID tag associated with the selected item. This search may continue, without any further input from the user until the RFID tag associated with the selected item, hence the phrase "one-touch search." When performing a search, however, controller 38 may "time out" if nothing is found within a pre-programmed period of time.

From item search state 66, the user may also select the right directional arrow of input interface 48 ("scroll right") to return controller 38 back to tag read state 64, or the user may select the left directional arrow of input interface 48 ("scroll left") to cause controller 38 to enter into generate database state 68. Again, if the user fails to make any selection within a set period of time, controller 34 times out and enters into sleep state 70 ("sleep timeout").

Assuming again, for purposes of illustration, that the user selected the right directional arrow of input interface 48, controller 38 enters into generate database state 68. Once in generate database state 68, input interface 48 may receive input from the user selecting an item from a master item list. Alternatively, the user may manually enter the item, e.g., if it is not included in a master item list. RFID interface 42 may interrogate an RFID tag and based on the interrogation, controller 38 can associate the selected item from the master item list with the interrogated RFID tag. If controller 38 determines that the RFID tag 36 is already associated with an item list, controller 38 adds the newly selected item to the item list. If controller 38 determines that the RFID tag 36 is not associated with any item list, controller 38 generates a new item list for RFID tag 36 and adds the newly selected item to the newly created list.

Also, the user may remove items from an item list associated with RFID tag 36. In this case, the user may select an item from the item list associated with RFID tag 36 and select "remove" or "delete." In this manner, the user can disassociate items from RFID tag 36, e.g., if an item is removed from a container to which RFID tag 36 is affixed.

Similar to the other states, the user may select the left directional arrow of input interface 48 ("left scroll") to cause controller 38 to return to item search state 66. The user may also select the right directional arrow of input interface 48 ("right scroll") to cause controller 38 to enter into tag read state 64. Finally, as above, if the user fails to make any selection within a pre-programmed period of time, controller 38 times out and enters into sleep state 70 ("sleep timeout").

If controller 38 enters into sleep state 70, controller 38 operates in power save mode to save power stored in power source 58. Once in sleep state 70, controller 38 may eliminate power to one or more of display 40, RFID interface 42, and memory 46. After eliminating the power, controller 38 may operate in a mode that reduces the functionality of the controller, wherein the reduced functionality includes polling input interface 48. Controller 38 may return to tag read state 64 once the user begins to interact with RFID reader 32 via input interface 48. In either instance, user interaction via input interface 48 causes controller 38, display 40, RFID interface 42, and memory 50 to return to a normal mode in which these components resume normal operation. Sleep state 70 allows RFID reader 34 to conserve power stored in power source 58. In some embodiments, controller 38 may not enter sleep state 70 when connected to another device via receptacle 52, particularly if power is supplied to controller 38 by the other device.

Although input interface 48 has been discussed in the context of a directional joystick, any type of input interface may suffice to cause controller 38 to traverse between tag read state 64, item search state 66, and generate database state 68. For example, in some embodiments, input interface 48 may comprise a small keyboard, and the user may select the "L" key to scroll left and the "R" key to scroll right from the small keyboard. In other embodiments, input interface 48 may comprise a touch-sensitive scroll wheel, and the user may touch the wheel in a counterclockwise motion to scroll left and in a clockwise motion to scroll right. Regardless of the type of input interface, no interaction with input interface 48 during a set period of time will cause controller 38 to enter into sleep state 70. Additional details of the functionality of the exemplary states of RFID reader 34 are outlined below.

Figure 4:
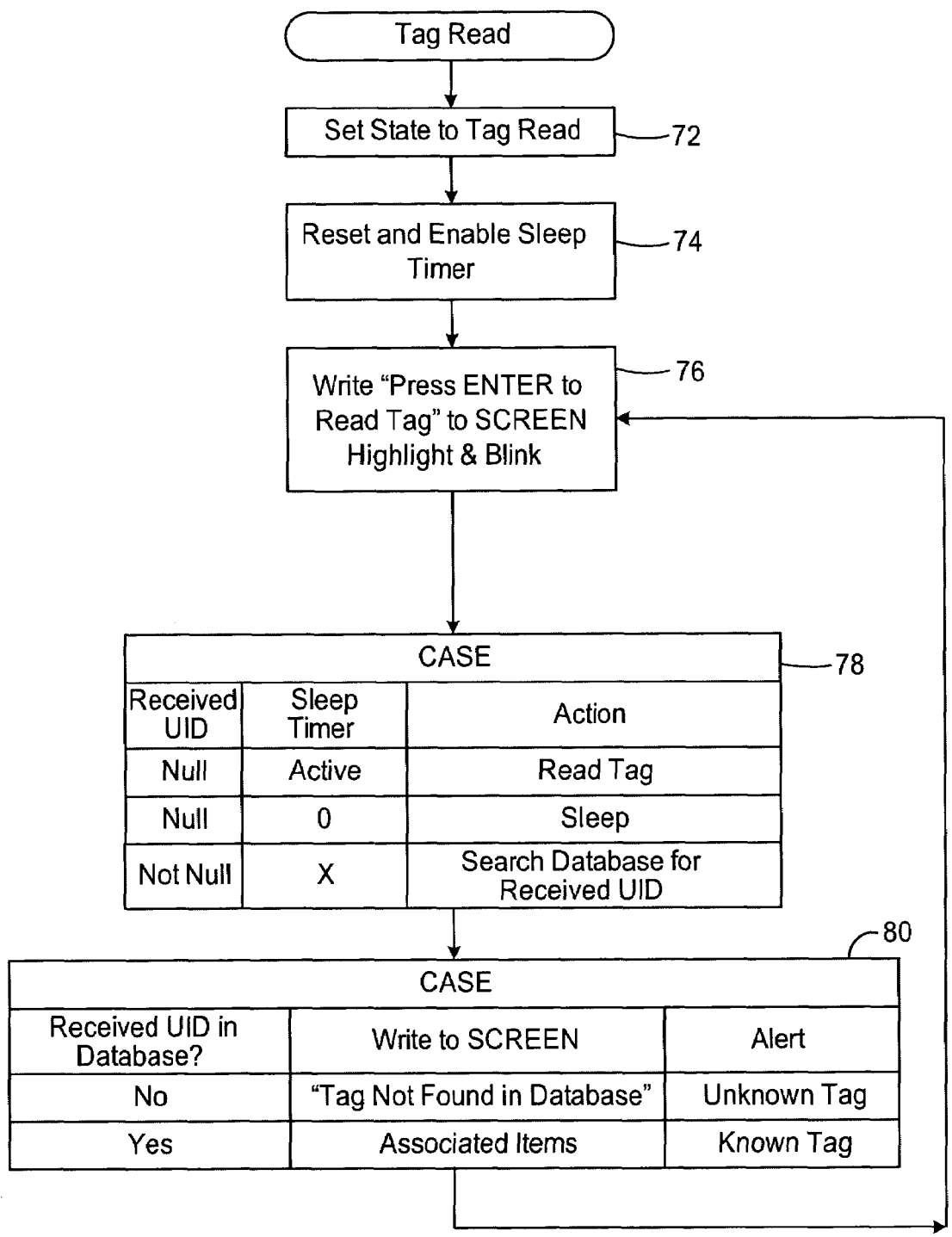
FIG. 4 is a flowchart illustrating an exemplary method for reading an RFID tag and displaying an item list associated with the RFID tag.

FIG. 4 is a flowchart illustrating an exemplary method for reading an RFID tag in a tag read state. In this case, the RFID tag is read and RFID reader 34 displays an item list associated with the RFID tag. For purposes of illustration, FIG. 4 will be described in reference to FIG. 2. However, the techniques may be implemented by other configurations of RFID reader 34 and may incorporate many other types of functionality described above, such as voice recognition and voice control.

Upon power up, controller 38 of RFID reader 34 begins in tag read state 64 (FIG. 3) and sets its current state to reflect entering tag read state 64 (72). Next, controller 38 resets and enables a sleep timer (not shown in FIG. 2) (74), which governs when controller 38 enters into sleep state 70 (FIG. 3). After enabling the sleep timer, controller 38 causes display of "Press ENTER to Read Tag" to the display screen and causes the display to highlight and blink this text (76). If another device is connected to controller 38 via receptacle 54, controller 38 also displays the text to a display of the other device. If, for example, a user connects a personal computer to RFID reader 34 via a USB cable inserted into receptacle 54, controller 38 may forward the text over datacom interface 52. Datacom interface 52, upon receiving the text, communicates the text to the personal computer via receptacle 54 and the inserted cable, whereupon the personal computer writes the text to its display, i.e., the active display. However, if the user does not connect another device to RFID reader 34, controller 38 simply writes the text to display 40, i.e., the active display.

In response to the text displayed via the active display, the user may interact with RFID reader 34 via input interface 48. Once the user presses the enter key, such as enter key 24 of FIG. 1, controller 38 enables RFID interface 42 to begin interrogating an RFID tag within proximity of antenna 44, as described above. Interrogation of the tag may be defined as energizing the tag when it is in range of the reader, obtaining the UID from the tag, and determining whether the UID is valid. The user may then bring RFID reader 34 within proximity of an RFID tag, such as RFID tag 36, and RFID interface 42 may receive the UID associated with passive RFID tag 36 via antenna 44. If a tag is not detected within a pre-programmed time, controller 38 may terminate the interrogation process and alert the user that no tag was detected. In this case, controller 38 remains in read tag state 64 and, if prompted by the user, may continue to interrogate for an RFID tag. If the sleep timer decrements to zero, and controller 38 has not received a valid, or not null, UID, controller 38 will enter sleep state 70 (case table 78).

Assuming, for purposes of illustration, that controller 38 received a valid, or not null, UID, controller 38 accesses a database stored in memory 46. The database comprises a collection of records, an example of which is shown in Table 1, below.

TABLE 1

| Record 1 | Record N |
|---|---|
| Record ID 1 | Record ID N |
| Tag UID | Tag UID |
| Identifier | Identifier |
| Record Size | Record Size |
| Item List | ... Item List |
| Error Correction Code | Error Correction Code |
| Record Delimiter | Record Delimiter |

As shown in the example of Table 1, each record may comprise a record ID (which enumerates the record), an associated tag UID, an identifier (which may be used to describe the record purpose or function), a count of the elements in the record (record size), an item list, an error correction code (ECC), and a record delimiter (to indicate the end of the record). The record ID, tag UID, identifier, and record size elements may be collectively called the record header for descriptive purposes. Controller 38 may access the database by translating the received UID into a memory address and reading the record file header at the memory address, and extract the item list based on the header information and the ECC. If controller 38 receives null data from the database, controller 38 determines that the UID is not in the database, and may write "Tag Not Found in Database" to the active display, as well as, cause audio device 50 to issue an alert associated with an unknown tag. The unknown tag alert may have a distinct volume and/or pitch. If controller 38 receives valid data from the database, controller 38 may write the item list of the associated record to the active display and cause audio device 50 to issue a known tag alert (case table 80). The known tag alert may differ from the unknown tag alert in volume and/or pitch.

More complex relationships may also be defined for different tags with respect to various items, different tags with respect to other tags, or different items with respect to other items. For example, multiple fields (or sub-fields) may be associated with each item. As one example, an item may be associated with a tag, and may also be associated with one or more item descriptors. The item descriptor may comprise any information that can help the user to recognize the item. Examples of item descriptors include the location where the item was taken from, a date when the item was loaded in the database, a phone number associated with the item or owner of the item, an identification of the owner of the item, or other information relevant to the item.

Also, multiple tags may be associated with a single item. For example, an item may be associated with a first tag that identifies a container in which the item is stored, and the same item may be associated with a second tag that identifies a location (such as a room) where the container is stored. These relationships are subject to a wide variety of implementation-specific arrangements. For example, the same relational result may be achieved by associating an item with two tags, or alternatively, the item may be associated with a first tag and the container to which the first tag is affixed (or the first tag itself) may be associated with a second tag. In any case, RFID reader 34 may simplify a search for the item by searching and locating any tag that brings the user closer to the item. RFID reader 34 may, for example, identify a tag associated with a room that includes a container that includes the item of interest. Upon entering the room, the user may continue the search until the container is located. In short, the relationships between several tags and various items and containers can become very complex, yet RFID reader 34 may allow for very user-friendly searching that makes the complex relationships seemingly transparent. The user simply selects the item of interest, and in response, RFID reader 34 locates the one or more tags associated with the item.

Following the read of a valid or invalid RFID tag, controller 38 may return to the original tag read display and prompt the user to "Press ENTER to Read Tag" (76). As described above, the user may select the right or left directional arrows of input interface 48 to "scroll right" or "scroll left" to cause controller 38 to enter respective generate database state 68 or item search state 66. In this manner, RFID reader 34 may read an RFID tag and display items associated with the RFID tag or allow the user to traverse to any one of the above described states. The actual interrogation during a tag read may incorporate power saving techniques, in which the power-intensive interrogation appears "continuous" to a user, but actually cycles on and off for a suitable time period, in order to reduce power consumption during the interrogation. Additional details of such discontinuous interrogation to reduce power consumption are outlined below.

Figure 5:
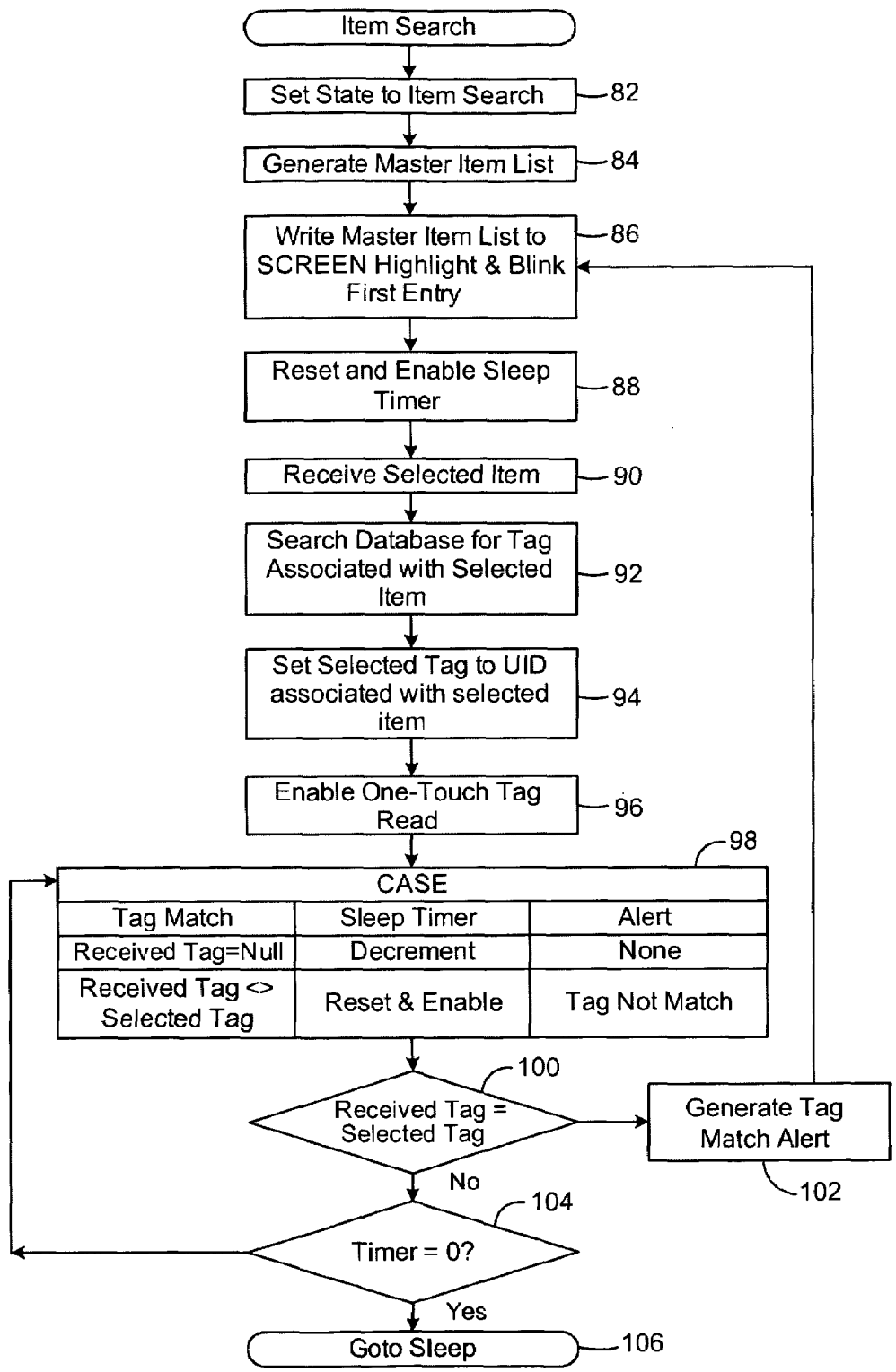
FIG. 5 is a flow chart illustrating an exemplary method for performing a one-touch search to locate a particular item associated with an RFID tag.

FIG. 5 is a flow chart illustrating an exemplary method for performing a one-touch search to locate a particular item associated with an RFID tag, such as RFID tag 36 (FIG. 2). As shown in FIG. 5, upon entering item search state 66 (FIG. 3), controller 38 sets the current state variable to item search (82) and generates the master item list (84). Controller 38 generates the master item list by accessing memory 46 to retrieve information from either a database created during generate database state 68 or a pre-programmed list, i.e., a master item picklist. After generating the master item list, controller 38 writes the master item list to the active display, as described above. In one example, controller 38 causes the active display to highlight and blink the first entry in the master item list (86), although other implementations may show the last item chosen for search. Alternatively, the highlighted item could blink after the user presses the enter button 24. Once the master item list is displayed, controller 38 resets and enables the sleep timer (88) and waits to receive an input from the user via input interface 48. While not shown explicitly in FIG. 5, controller 38 may timeout and enter into sleep state 70 if the sleep timer expires.

Assuming, for purposes of illustration, that controller 38 did not timeout, controller 38, therefore, received a selection from the user via input interface 48 (90) and, in response to receiving the selected item, controller 38 searches the database for an RFID tag UID associated with the selected item (92). Controller 38 may search the database by accessing records stored in the database (such as shown in Table 1) and comparing the selected item to each item in the item list of each record. Once controller 38 finds the appropriate record, controller 38 may store the associated RFID tag UID to local controller memory, such as a register, by setting the selected tag to the UID associated with the selected item (94).

After determining the correct RFID tag UID, controller 38 enables one-touch tag read method (96) and may prompt the user to "Press ENTER to Begin One-Touch Searching." Again, should the user fail to interact with RFID reader 34 within a preprogrammed period of time, controller 38 may enter into sleep state 70 (not shown in FIG. 5). Once the user selects the enter key of input interface 48, controller 38 enables RFID interface 42 so that RFID interface 42 can begin to interrogate RFID tags. Next, the user may bring RFID reader 34 within proximity of an RFID tag, such as RFID tag 36, whereupon RFID interface 42 interrogates and receives the UID associated with RFID tag 36 via antenna 42. Controller 38 receives the UID from RFID interface 42 and compares the received tag UID to the selected tag UID. If the received tag UID is invalid, or null, controller 38 simply decrements the sleep timer, keeps RFID interface 42 active, and does not cause audio device 50 to issue an alert. If, however, the received tag UID is not null but does not equal the selected tag UID, controller 38 resets and enables the sleep timer, and causes audio device 50 to issue a tag not match alert, which may decrease in volume and pitch (case table 98). Controller 38 may also write text to either the attached device or display 40 to indicate that the tag did not match.

After the user receives the audible and visual indications that the tags do not match, the user may scan another RFID tag without any further interaction with RFID reader 34. In accordance with the one-touch search functionality, the user may simply bring RFID reader 34 within proximity of another RFID tag without needing to press or actuate anything else. Controller 38 repeats the process above and compares the received tag UID to the selected item UID (100). If the received tag UID does not match the selected item UID, controller 38 merely repeats the process again without any interaction between the user and RFID reader 34 as long as the sleep timer has not reached zero (104). However, if the received tag UID and selected item UID match, controller 38 causes audio device 50 to issue a tag match alert (102) and may write text to the appropriate display that indicates a tag match. Controller 38, upon a tag match, writes the master list to the active display (86). If no tag match occurs and the sleep timer reaches zero, controller 38 enters into sleep state 70 (106). Thus, RFID reader 34 allows a user to quickly search numerous tagged entities to locate a particular item. When compared to traditional labels, RFID reader 34 may provide a more convenient and organized solution to finding a particular item.

The actual interrogation by RFID reader 34 may appear "continuous" to a user. However, in order to reduce power consumption, the interrogation process (described previously) may cycle on and off according to a power saving interrogation technique. This cycling of the interrogation occurs at an appropriate time interval. The cycle time of the interrogation technique to conserve power may be sufficiently small such that the transit time required for a user to move RFID reader 34 from one tag to the next is significantly longer than the cycle time. Delay time may be programmed into the interrogation cycle such that the RFID interface 42 is substantially off (or powered down) during the transit time. Therefore, to a user, the interrogation may appear continuous, yet be discontinuous for better power conservation. In any case, the interrogation (whether continuous or cycling) continues until the RFID tag is found, the user interacts with the RFID reader, or a timer expires to terminate the interrogation.

Figure 6A:
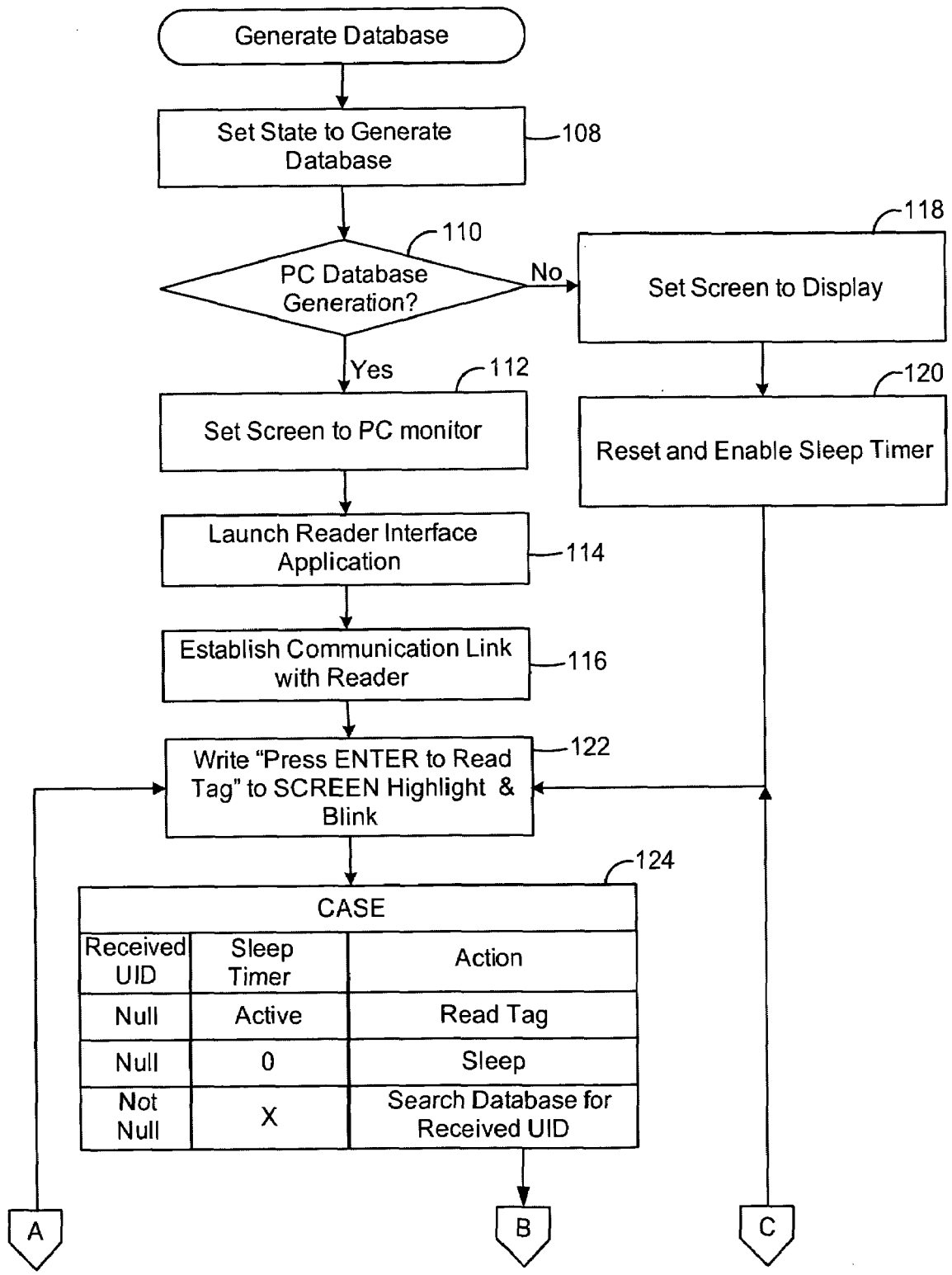
FIGS. 6A and 6B are flowcharts illustrating an exemplary method for generating a database and editing an existing database.
Figure 6B:
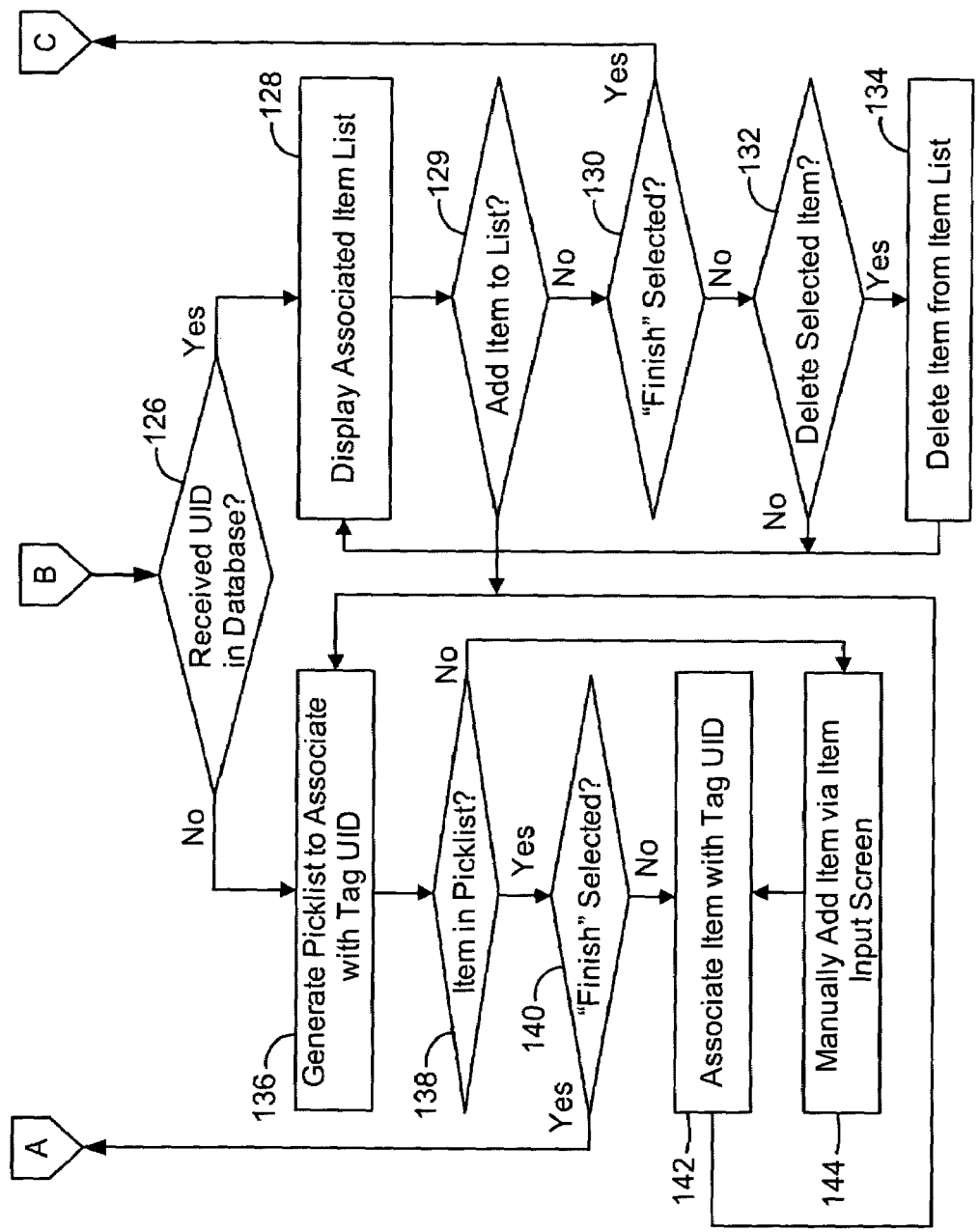

FIGS. 6A and 6B are flowcharts illustrating an exemplary method for generating a database and editing an existing database. Upon entering generate database state 68, controller 38 of RFID reader 34 sets the current state to the generate database state (108) and determines if a personal computer (PC) should provide input during the generation of a database (110). Controller 38 determines if a PC is attached to RFID reader 34 by communicating with datacom interface 52, which manages receptacle 54. Datacom interface 52 may poll receptacle 54 to determine whether a PC is attached to receptacle 54. If a user has connected a PC to RFID reader 34, controller 38 sets the active display to the PC monitor (112) and communicates with the PC via datacom interface 52 to cause the PC to launch the reader interface application installed on the PC (114). Next, controller 38 establishes a communication link with the reader interface application (116). However, if the user did not connect a PC to RFID reader 34, controller 38 sets the active display to display 40 (118) and resets and enables the sleep timer (120).

Depending on whether the user connected a PC to RFID reader 34, controller 38 writes "Press ENTER to Read Tag" to the active display, i.e., either the PC display, if connected, or display 40, and causes the active display to highlight and blink the text (122); note that in other embodiments, the text may not blink. Next, the user may either fail to select the enter key of input interface 48 or may press the enter key but fail to bring RFID reader within sufficient proximity to interrogate RFID tag 36. In these instances, if the sleep timer remains active, controller 38 may continue to read tags by keeping RFID interface 42 enabled. However, if the sleep timer reaches zero, controller 38 may enter into sleep state 70. If the user selects the enter key of input interface 48 and brings RFID reader 34 within sufficient proximity of RFID tag 36, controller 38 receives the UID associated with RFID tag 36 and searches the database stored in memory 46 for the received UID (Case table 124). Controller 38 may search through all the available records of the database to determine if the received UID is in the database, or controller 38 may use the UID as an index into the database (126). Controller 38 determines that the UID is in the database by comparing the received UID to the UID of each record.

If the received UID matches one of the UIDs stored in the database records (yes branch of 126), controller 38 indexes into the database, reads the item list associated with the UID from memory 46, and displays the associated item list to the active display (128). The user may also have the option of "Adding an Item to the list" (129). Prior to writing an item list to the display, controller 38 may append an "Add Item" and a "Finish" item to the end of the list, and the user may select these additional items, if desired. If the user selects the "Finish" item (132), controller 38 writes the "Press Enter to Read Tag" text to the active display, as well as, causes the active display to highlight and blink the text (122). If the users selects the "Add Item" item, then controller 38 branches to the operations for adding items to the database (136). If the user does not select the "Add Item" or "Finish" and, instead, selects one of other items in the displayed item list via input interface 48, controller 38 may prompt the user to delete the selected item by writing text to the active display (132). The user may select to delete the item via input interface 48, and, in response to this selection, controller 38 deletes the selected item from the associated record in the database (134). If the user chooses not to delete the item, controller 38 displays the associated item list on the active display (128).

If the received UID does not match one of the UIDs stored in the database records (no branch of 126), controller 38 accesses memory 46 to retrieve a pre-programmed item list, or "picklist," from which the user may select items to associate with the RFID tag UID (136). The user may select an item from the picklist or may manually enter the item via either input interface 48 or the attached device, if available (138). If the user selects an item from the picklist, controller 38 first determines if the user selected the "finish" item from the picklist (140), which controller 38 may append to the picklist, as described above. If the user selects the "finish" item, controller 38, again, writes the "Press Enter to Read Tag" text to the active display, as well as, causes the active display to highlight and blink the text (122).

If the user does not select the "finish" item, controller 38 associates the selected item with the received tag UID. Controller 38 may determine that the selected picklist item is the first item to associate with the received UID and may create a new record in the database corresponding with the received UID. After creating the new record and receiving the record's memory address, controller 38 may write the selected item to this memory address of memory 46. If controller 38 determines that the record already exists, controller 38 may simply write the selected item to the appropriate memory address associated with this record.

Controller 38 may also append to the item list an "add manually" item. If the user selects the "add manually" item, controller 38 allows the user to manually add the item via the item input screen (144). Controller 38 displays the item input screen via the active display and, in some embodiments, the item input screen may present a keyboard layout that a user can navigate via interface input 48 to enter the item name. In other embodiments, interface input 48 may comprise a small keyboard that the user can use to input the item name. In still other embodiments, interface input 48 may comprise a numerical pad that the user can use to input the item name by tapping, for example, the "2" key three times to indicate the character "C", much as a cellular phone receives numerical input. As with cellular phones, controller 38, in the latter embodiment, may also execute intelligent tapping software that may determine the item name from a fraction or subset of the input item name, thereby facilitating item name entry more quickly. In still other embodiments, controller 38 may receive the item name from another device attached to RFID reader 34 via receptacle 54 or a wireless interface (not shown).

After inputting the item name, controller 38 associates the input item name with the received tag UID (142), as described above. Whether selected from the picklist or manually entered, controller 38 generates the picklist to associate with the received tag UID (138) and displays the picklist to the active display. In this manner, the user may utilize RFID reader 34 to generate a database to associate with an RFID tag UID or edit a previously generated database associated with an RFID tag UID.

Figure 7:
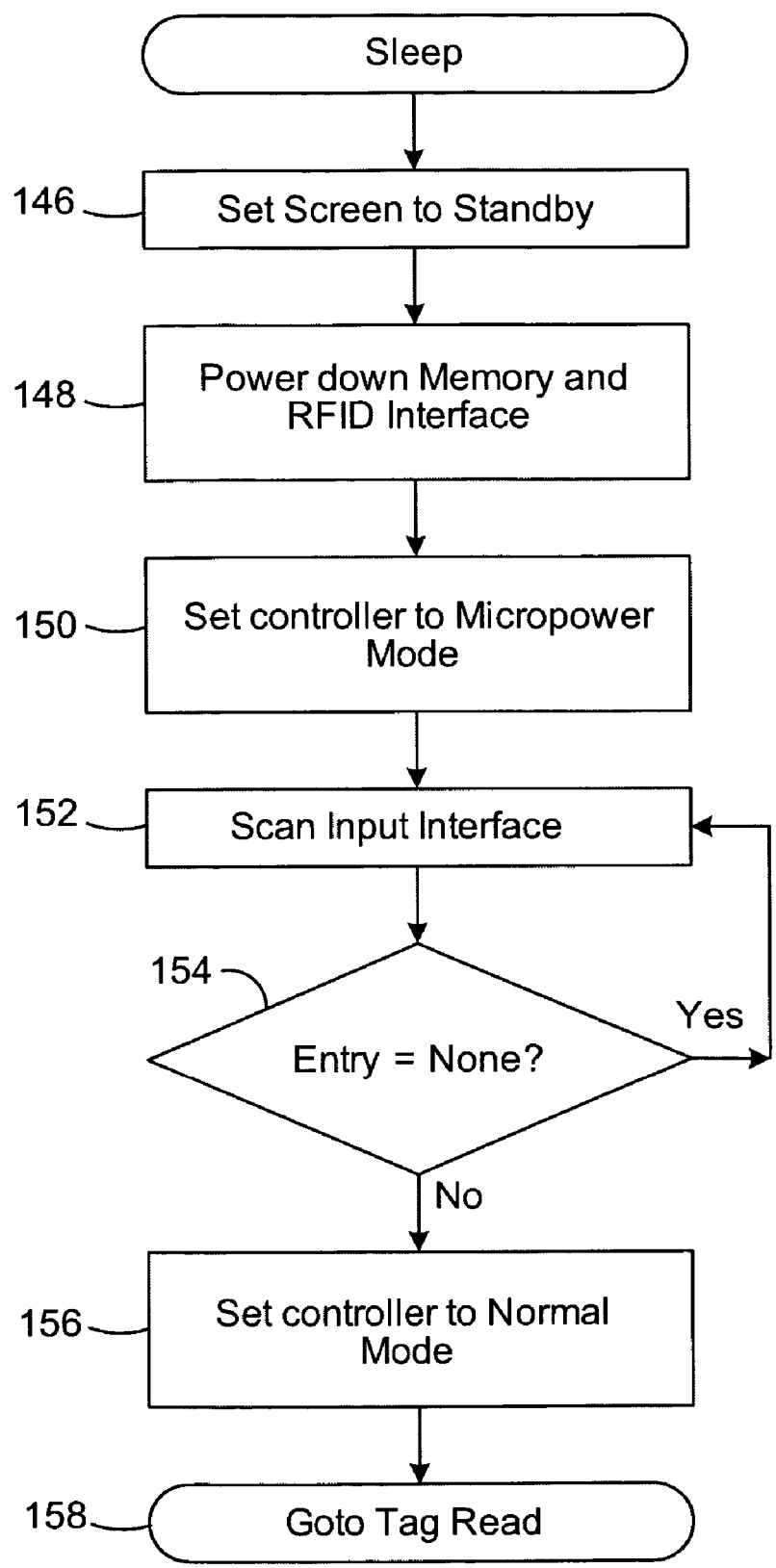
FIG. 7 is a flowchart illustrating an exemplary method for powering down an RFID reader.

FIG. 7 is a flowchart illustrating an exemplary method for powering down an RFID reader, such as RFID reader 34 of FIG. 2. Initially, upon entering sleep state 70 (FIG. 3), controller 38 of RFID reader 34 sets the current state to sleep state 70 and sets the active display, described above, to standby (146). After setting the active display to standby, controller 38 may reduce power or turn off, i.e., power down, memory 46 and RFID interface 42 (148). Next, controller 38 enters into micropower mode (150), which keeps controller 38 in a minimal power usage state, but does not completely eliminate the functionality of controller 38. The minimal functionality allows controller 38 to routinely scan input interface 48 (152). If input interface 48 does not receive an input from a user, controller 38 will continue to scan input interface 48 (152). However, if input interface 48 receives input from the user, controller 38 returns to normal mode (156) and powers up those components that it powered down, such as the active display, RFID interface 42, and memory 46. Upon returning to normal mode, controller 38 enters into tag read state 64, as illustrated in FIG. 3.

In this manner, RFID reader 34 may provide one-touch search, tag read, generate database, and power-save, or sleep, capabilities by allowing a user to traverse between respective item search, tag read, generate database, and sleep state by interacting with RFID reader 34 via an active display, audio device 50, receptacle 54, and input interface 48.

As described above, one-touch search capabilities allow the user to quickly and efficiently locate a selected item by merely selecting the item and, without further input, scan multiple RFID tags, such as passive RFID tag 36. Furthermore, RFID reader 34 may cost considerably less than traditional RFID readers if the functionality of the reader is limited to the states outlined herein. Moreover, RFID reader 34 may cost less than other devices offering RFID reader capabilities, such as PDAs, particularly if RFID reader 34 does not offer the higher levels of functionality of conventional PDAs. In other examples, however, RFID reader 34 may incorporate additional functionality, such as Bluetooth, voice recognition, and additional software modules, although such functionality would add additional cost. In any case, RFID reader 34 may provide an affordable and efficient alternative to typical labeling methods, such as traditional labels, and may offer increased functionality insofar as label space is not an issue.

Various embodiments of the invention have been described. In particular, several techniques for an RFID reader have been described, including one-touch searching techniques. The described techniques may be implemented in an RFID reader using hardware, software, firmware, or any combination thereof. If implemented in software, the techniques may be embodied on a computer readable medium that stores executable instructions that upon execution cause the reader to perform one or more of the techniques described herein. However, various modifications may be made to the techniques described herein without departing from the spirit and scope of the invention. For example, additional states or sub-states could also be defined for the device. As one example, the RFID reader may also implement a "write to tag" state in which the RFID reader can write information to the tag. Moreover, writing to a tag could be a sub-routine to the "generate database" state, e.g., to write a time or date stamp on the RFID tag.

In an added embodiment, the one-touch searching techniques described herein may be expanded to allow for one-touch searching for a plurality of RFID tags associated with a selection. For example, if the user were to select an item such as "kitchen" or "living room," and several RFID tags were associated with the selection, the one-touch search may continue until all RFID tags associated with the selection were identified. Like the other one-touch searches described above, a one-touch search for a selection that has several RFID tags associated therewith may continue, with no further input from the user, until the selected item is found, the user intervenes, or a timer expires. Different alerts may be defined, in this case, to identify when one associated RFID tag is found and when a last associated RFID tag is found so that the user may be aware when all the RFID tags associated with the selection have been found. In this case, the database relationships defined in the RFID reader would allow several items to be associated with a given RFID tag, but would also allow several RFID tags to be associated with a selectable entry, which itself could be an item or a descriptor of one or several items, such as a location, e.g., "kitchen."

In accordance with this added embodiment, which may also be implemented by an RFID reader in hardware, software, firmware, or any combination, a method may comprise receiving input from a user making a selection in a radio frequency identification (RFID) reader, identifying a set of RFID tags associated with the selection, and causing the RFID reader to search for the set of RFID tags associated with the selection. Moreover, causing the RFID reader to search may comprises interrogating a plurality of RFID tags, identifying interrogated RFID tags that are in the set of RFID tags associated with the selection, and terminating the interrogation upon identifying all RFID tags in the set. Of course, like the other embodiments described above, tag interrogation may also terminate if the user intervenes, or a timer expires. These and other embodiments are within the scope of the following claims.

The invention claimed is:

1. A method comprising:
 receiving input from a user selecting an item in a radio frequency identification (RFID) reader, wherein the RFID reader includes a database in which each of a plurality of RFID tags has an associated item list;
 identifying an RFID tag associated with the selected item from the plurality of RFID tags based on the input from the user; and
 causing the RFID reader to search for the RFID tag associated with the selected item, wherein the selected item is in the associated item list of the identified RFID tag.

2. The method of claim 1, wherein identifying the RFID tag comprises accessing a memory to search the database for the selected item.

3. The method of claim 1, wherein receiving input comprises receiving a selection from the user, wherein the method comprises a one-touch search in which the RFID reader continues searching for the RFID tag associated with the selected item until the RFID tag is found, the user interacts with the RFID reader, or a timer expires.

4. The method of 1, wherein causing the RFID reader to search comprises:
 interrogating the plurality of RFID tags; and
 terminating the interrogation upon identifying the RFID tag associated with the selected item.

5. The method of claim 4, further comprising:
 terminating the interrogation if a user intervenes; and
 terminating the interrogation if a timer expires.

6. The method of claim 4, wherein interrogating the plurality of RFID tags comprises cycling interrogation on and off over a time period that is sufficiently small in comparison to a transit time associated with relative movement of the RFID reader from one RFID tag to another RFID tag such that the reader is substantially off during the transit time, and cycling thereafter.

7. The method of claim 4, wherein after terminating the interrogation, the method further comprises:
   causing an audio device to emit an audio alert upon identifying the RFID tag associated with the selected item; and
   causing a display to display a visual indication that indicates a tag match upon identifying the RFID tag associated with the selected item.

8. A radio frequency identification (RFID) reader comprising:
   an input interface that receives input from a user selecting an item, wherein the RFID reader includes a database in which each of a plurality of RFID tags has an associated item list; and
   a controller that identifies an RFID tag associated with the selected item from the plurality of RFID tags based on the input from the user, and causes the RFID reader to search for the RFID tag associated with the selected item, wherein the selected item is in the associated item list of the identified RFID tag.

9. The RFID reader of claim 8, wherein the controller identifies the RFID tag by accessing a memory to search the database for the selected item.

10. The RFID reader of claim 8, wherein the input interface receives input by receiving a selection from the user, wherein the RFID reader executes a one-touch search in which the RFID reader continues searching for the RFID tag associated with the selected item until the RFID tag is found, the user interacts with the RFID reader, or a timer expires.

11. The RFID reader of claim 8, wherein the controller causes the RFID reader to search by causing the RFID reader to:
   interrogate the plurality of RFID tags; and
   terminate the interrogation upon identifying the RFID tag associated with the selected item.

12. The RFID reader of claim 11, wherein when the RFID reader terminates the interrogation, the controller:
   causes an audio device to emit an audio alert upon identifying the RFID tag associated with the selected item; and
   causes a display to display a visual indication that indicates a tag match upon identifying the RFID tag associated with the selected item.

13. A computer-readable medium comprising instructions that cause an RFID reader to:
   receive input from a user selecting an item a radio frequency identification (RFID) reader, wherein the RFID reader includes a database in which each of a plurality of RFID tags has an associated item list;
   identify an RFID tag associated with the selected item from the plurality of RFID tags based on the input from the user; and
   search for the RFID tag associated with the selected item, wherein the selected item is in the associated item list of the identified RFID tag.

14. The computer readable medium of claim 13, wherein the instructions identify the RFID tag by accessing a memory to search the database.

15. The computer readable medium of claim 13, wherein the instructions recieve input by recieving a selection from the user, wherein the instructions cause the RFID reader to perform a one-touch search in which the RFID reader continues searching for the RFID tag associated with the selected item until the RFID tag is found, the user interacts with the RFID reader, or a timer expires.

16. The computer readable medium of claim 13, wherein the instructions cause the RFID reader to search by:
   interrogating the plurality of RFID tags; and
   terminating the interrogation upon identifying the RFID tag associated with the selected item.

17. The computer readable medium of claim 16, wherein the instructions upon terminating the interrogation:
   cause an audio device to emit an audio alert upon identifying the RFID tag associated with the selected item; and
   cause a display to display a visual indication that indicates a tag match upon identifying the RFID tag associated with the selected item.

18. A method comprising:
   receiving input from a user selecting a state of a radio frequency identification (RFID) reader from a plurality of states, wherein the plurality of states include an item search state in which the user selects an item, the selected item is within an item list associated with a particular RFID tag, and the RFID reader searches for the particular RFID tag, a generate database state in which the user associates items with RFID tags to create item lists for the RFID tags, and a tag read state in which the RFID reader reads a given RFID tag and displays a given item list of the given RFID tag; and
   controlling the RFID reader according to the selected state.

19. The method of claim 18, wherein receiving the input from the user comprises receiving input selecting the item search state, wherein controlling the RFID reader according to the selected state comprises:
   receiving input from the user selecting the item;
   identifying the particular RFID tag associated with the selected item; and
   causing the RFID reader to search for the particular RFID tag associated with the selected item until the particular RFID tag is found, the user interacts with the RFID reader, or a timer expires.

20. The method of claim 18, wherein receiving the input from the user comprises receiving input selecting the tag read state, wherein controlling the RFID reader according to the selected state comprises:
   causing the RFID reader to read the given RFID tag;
   displaying items from the given item list if the given item list exists; and
   providing an alert if the given item list does not exist.

21. A method comprising:
   receiving input from a user selecting a state of a radio frequency identification (RFID) reader from a plurality of states, wherein the plurality of states include an item search state, a generate database state and a tag read state; and
   controlling the RFID reader according to the selected state, wherein receiving the input from the user comprises receiving input selecting the generate database state, wherein controlling the RFID reader according to the selected state comprises:
   causing the RFID reader to read an RFID tag;
   receiving input from the user identifying one or more items; and
   associating the one or more items with the RFID tag.

22. A method comprising:
receiving input from a user selecting a state of a radio frequency identification (RFID) reader from a plurality of states, wherein the plurality of states include an item search state, a generate database state and a tag read state; and
controlling the RFID reader according to the selected state, the method further comprising:
in response to receiving input selecting the item search state, displaying an item list, receiving input from the user selecting a first item from the item list, identifying a first RFID tag associated with the selected item, and causing the RFID reader to search for the first RFID tag associated with the selected item;
in response to receiving input selecting the generate database state, causing the RFID reader to read a second RFID tag, receiving input from the user identifying a second item, and associating the second item with the second RFID tag; and
in response to receiving input selecting the tag read state, causing the RFID reader to read a third RFID tag, and displaying items from a database associated with the third RFID tag.

23. A computer readable medium comprising instructions that upon execution in a radio frequency identification (RFID) reader cause the RFID reader:
receive input from a user selecting a state of an RFID reader from a plurality of states, wherein the plurality of states include an item search state in which the user selects an item, the selected item is within an item list associated with a particular RFID tag, and the RFID reader searches for the particular RFID tag, a generate database state in which the user associates items with RFID tags to create item lists for the RFID tags, and a tag read state in which the RFID reader reads a given RFID tag and displays a given item list of the given RFID tag, and
operate according to the selected state.

24. The computer readable medium of claim 23, wherein upon receiving input selecting the item search state, the instructions cause the reader to operate according to the selected state by:
receiving input from the user selecting the item;
identifying the particular RFID tag associated with the selected item; and
causing the RFID reader to search for the particular RFID tag associated with the selected item until the particular RFID tag is found, the user interacts with the RFID reader, or a timer expires.

25. A computer readable medium comprising instructions that upon execution in a radio frequency identification (RFID) reader cause the RFID reader:
receive input from a user selecting a state of an RFID reader from a plurality of states, wherein the plurality of states include an item search state, a generate database state and a tag read state; and
operate according to the selected state, wherein upon receiving input selecting the generate database state, the instructions cause the reader to operate according to the selected state by:
causing the RFID reader to read an RFID tag;
receiving input from the user identifying an item; and
associating the item with the RFID tag.

26. The computer readable medium of claim 23, wherein upon receiving input selecting the tag read state, the instructions cause the reader to operate according to the selected state by:
causing the RFID reader to read the given RFID tag;
displaying items from the given item list if the given item list exists; and
providing an alert if the given item list database does not exist.

27. A computer readable medium comprising instructions that upon execution in a radio frequency identification (RFID) reader cause the RFID reader:
receive input from a user selecting a state of an RFID reader from a plurality of states, wherein the plurality of states include an item search state, a generate database state and a tag read state; and
operate according to the selected state, wherein: in response to receiving input selecting the item search state, the instructions cause the reader to display an item list, receive input from the user selecting a first item from the item list, identify a first RFID tag associated with the selected item, and search for the first RFID tag associated with the selected item;
in response to receiving input selecting the generate database state, the instructions cause the reader to read a second RFID tag, receive input from the user identifying a second item, and associate the second item with the second RFID tag; and
in response to receiving input selecting the tag read state, the instructions cause the reader to read a third RFID tag, and display items from a database associated with the third RFID tag.

28. A radio frequency identification (RFID) reader comprising:
an input interface that receives input from a user selecting a state of the reader from a plurality of states, wherein the plurality of states include an item search state in which the user selects an item, the selected item is within an item list associated with a particular RFID tag, and the RFID reader searches for the particular RFID tag, a generate database state in which the user associates items with RFID tags to create item lists for the RFID tags, and a tag read state in which the RFID reader reads a given RFID tag and displays a given item list of the given RFID tag; and
a controller that operates the reader according to the selected state.

29. The RFID reader of claim 28, wherein when the input from the user selecting the state of the reader selects the item search state, the controller:
receives input from the user via the input interface selecting the item;
identifies the particular RFID tag associated with the selected item; and
causes the RFID reader to search for the particular RFID tag associated with the selected item until the particular RFID tag is found, the user interacts with the RFID reader, or a timer expires.

30. The RFID reader of claim 28, wherein when the input from the user selecting the state of the reader selects the tag read state, the controller:
causes the RFID reader to read the given RFID tags; and
displays items from the given item list if the given item list exists; and
provides an alert if the given item list does not exist.

31. A radio frequency identification (RFID) reader comprising:
an input interface that receives input from a user selecting a state of the reader from a plurality of states, wherein the plurality of states include an item search state, a generate database state and a tag read state; and a controller that operates the reader according to the selected state, wherein when the input from the user selecting the state of the reader selects the generate database state, the controller:

causes the RFID reader to read one of the RFID tags;

receives input from the user identifying an item; and associates the item with the one of the RFID tags.

32. A radio frequency identification (RFID) reader comprising:

an input interface that receives input from a user selecting a state of the reader from a plurality of states, wherein the plurality of states include an item search state, a generate database state and a tag read state; and a controller that operates the reader according to the selected state, wherein:

in response to receiving input selecting the item search state, the controller displays an item list, receives input from the user selecting a first item from the item list, identifies a first RFID tag associated with the selected item, and causes the RFID reader to search for the first RFID tag associated with the selected item;

in response to receiving input selecting the generate database state, the controller causes the RFID reader to read a second RFID tag, receives input from the user identifying a second item, and associates the second item with the second RFID tag; and in response to receiving input selecting the tag read state, the controller causes the RFID reader to read a third RFID tag, and displays items from a database associated with the third RFID tag.

* * * * *

UNITED STATES PATENT AND TRADEMARK OFFICE
CERTIFICATE OF CORRECTION

PATENT NO. : 7,413,124 B2  
APPLICATION NO. : 11/184631  
DATED : August 19, 2008  
INVENTOR(S) : John W. Frank Page 1 of 1

It is certified that error appears in the above-identified patent and that said Letters Patent is hereby corrected as shown below:

Column 16  
Line 60, In Claim 4, after "of" insert -- claim --, therefor.

Column 17  
Line 67, In Claim 15, delete "recieve" and insert -- receive --, therefor.  
Line 67, In Claim 15, delete "recieving" and insert -- receiving --, therefor.

Signed and Sealed this

Twenty-second Day of December, 2009

David J. Kappos  
*Director of the United States Patent and Trademark Office*